United States Patent
Farnsworth et al.

(10) Patent No.: US 6,747,257 B1
(45) Date of Patent: Jun. 8, 2004

(54) MONOLITHIC OPTICAL PICKUP AND AN ASSEMBLY INCLUDING THE PICKUP WITH LASER SOURCE(S) AND OPTICAL DETECTOR(S)

(75) Inventors: Stephen W. Farnsworth, Loveland, CO (US); Kirk Cook, Lyons, CO (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/569,096

(22) Filed: May 10, 2000

(51) Int. Cl.[7] .............................................. G02B 27/40
(52) U.S. Cl. .................. 250/201.5; 250/216; 369/44.11
(58) Field of Search .............................. 250/201.5, 216; 369/44.11, 44.14, 44.15; 359/813–814, 823–824

(56) References Cited

U.S. PATENT DOCUMENTS

| | | | |
|---|---|---|---|
| 4,718,052 A | * | 1/1988 | Kondo et al. ............ 369/44.12 |
| 5,886,971 A | * | 3/1999 | Feldman et al. ........ 369/112.05 |
| 5,949,066 A | | 9/1999 | Rice et al. |
| 6,262,414 B1 | * | 7/2001 | Mitsuhashi ................. 250/216 |

* cited by examiner

Primary Examiner—David Porta
Assistant Examiner—Patrick J. Lee
(74) Attorney, Agent, or Firm—Fish & Richardson P.C.

(57) ABSTRACT

A monolithic optical pickup has all passive optical elements aligned during fabrication, thereby requiring no alignment during the assembly of a system utilizing it. Its supporting structure is the monolithic passive device itself. A single surface incorporates all the functions of an optical pickup system including a focusing element, image creation apertures and stops, scattering/reflection reduction, and return path apertures and optics. The elements are formed from a metalized layer which is applied lithographically. Placing the apertures and stops on the principal plane of the focussing element allows for the image size to be precisely controlled by the image distance. The monolithic optical pickup is well suited for use with multiple detector elements. Alternate embodiments of the invention may omit some of the optical system elements.

24 Claims, 6 Drawing Sheets

MONOLITHIC OPTICAL PICKUP AND AN ASSEMBLY INCLUDING THE PICKUP WITH LASER SOURCE(S) AND OPTICAL DETECTOR(S)

BACKGROUND OF THE INVENTION

1. Field of the Invention

The invention generally relates to optically assisted magnetic disk drives. More particularly, the invention relates to the optical detection system used in a optically assisted magnetic disk drive to detect marks on a magnetic disk and thereby precisely located the magnetic read/write head relative to tracks on the disk.

2. Brief Description of the Prior Art

Since the introduction of the personal computer in the 1970s and the development of the floppy disk, the need for greater and greater amounts of storage space has continued unabated. The original floppy disk could store less than 100 kilobytes and the most commonly used (3.5 inch) floppy disk today, introduced in the late 1980s can store 1.4 megabytes. Although fixed (hard) disks now store many gigabytes, there remains a need for removable storage media with high capacity.

High capacity removable storage media became popular in the 1980s with the advent of desktop publishing (DTP). Relatively large, clumsy, and undependable "cartridges" from Syquest, Iomega, and other companies were used to transport large DTP files that could not fit on a floppy disk, to a printing plant. High capacity storage media is still in demand today for transporting large files when a broadband connection is not available and for transporting confidential information without using the public network.

One high capacity removable media system which is growing in popularity is the "a:drive" from OR Technology Inc. of Campbell, Calif. While its outward appearance is almost indistinguishable from that of a 3.5 inch, 1.44 megabyte floppy disk drive, the "a:drive" provides 120 megabytes of storage on ultra high density disks, known as LS-120 media. At the same time, the "a:drive" product is compatible with current and legacy 3.5 inch technology and can read and write to both 720 kilobyte and 1.44 megabyte disks. As its name implies, the "a:drive" can serve as a bootable drive in any system in which it is installed.

The "a:drive" achieves its high capacity and enhanced accuracy and reliability by using an optical positioning system for accurately guiding a magnetic dual-gap head that accommodates the differing track densities of conventional and ultra high density disks without error or mishap. Prior art FIG. 1 shows a dual media disk storage system for reading data from and writing data to the surface 10 of removable magnetic media 12 having an axis of rotation 14 and a plurality of concentric data tracks 16. Although the disk drive system is capable of handling dual media, in this instance, for the sake of clarity, only one disk is shown, the well known 3.5 high density type that holds 1.44 megabytes when formatted. A read/write head 18 is guided by an actuator 20 and actuator arm 22 which positions the read/write head 18 over a desired track 16 on the surface 10 of disk 12. The actuator arm 22 carries a strip having a periodic reflection profile 24 which is used in this instance because the 3.5 disks do not carry any location markings on their surface. In this instance, the periodic reflection profile 24 is a linear encoder. Actuator 20 is under control of a conventional, closed loop servo system 26 which is responsive to a signal from an optical sensor 30 mounted on the underside of sensor housing 28.

FIG. 2 shows in more detail how a split beam arrangement is used to detect either the reflection profile for a linear encoder when reading/writing 3.5 disks or the markings on the surface of an LS-120 disk when reading/writing it. The sensor system carried on the arm 22 includes, in addition to the light detector 30, a laser source 32, a hologram 34, a lens array 36 and a rooftop mirror 38. Light from the laser.source 32 is diffracted by the hologram 34 and focused by the lens array 36. The rooftop mirror directs the light and reflections to either the linear encoder 24 or the surface of an LS-120 disk 40.

It can be appreciated from prior art FIG. 2 that the sensor system requires multiple passive optical elements, all of which must be aligned during the assembly process. The alignment requires expensive tooling. Each passive element occupies a finite space and additional space must be provided for the alignment tooling. The sizes of the elements also require a large mechanical supporting structure.

SUMMARY OF THE INVENTION

It is therefore an object of the invention to provide an optical pickup for a data storage device.

It is also an object of the invention to provide an optical pickup for a data storage device that does not require alignment of elements during assembly of the data storage device.

It is another object of the invention to provide an optical pickup for a data storage device that reduces the overall cost of the data storage device.

It is still another object of the invention to provide an optical pickup for a data storage device that is smaller in size than conventional optical pickup systems.

It is also an object of the invention to provide an optical pickup that is a monolithic passive element.

It is another object of the invention to provide an optical pickup in which all optical system elements are fabricated on a single surface of a substrate.

It is still another object of the invention to provide an optical pickup in which each optical element and aperture are tightly controlled relative to each other.

It is also an object of the invention to provide an optical pickup that has a well controlled source distance for image creation and a well controlled image distance for reimaging onto one or more detectors.

It is another object of the invention to provide a monolithic optical pickup borne on a carrier with a laser source and one or more detectors.

In accord with these objects which will be discussed in detail below, the present invention provides a monolithic optical system having all passive optical elements aligned during fabrication, which is done on a wafer level in a batch process, thereby requiring no alignment during system assembly. Its supporting structure is the monolithic passive device itself. A single surface incorporates all the functions of an optical pickup system including a focusing element, image creation apertures and stops, scattering/reflection reduction, and return path optics and apertures.

The focusing element is placed on the monolithic surface to control the image location relative to the source location. Assembly techniques are utilized which tightly control the source location so that a monolithic optical element will repeatedly place the image at a required location. In addition, aberration correction is applied to the focusing element to ensure a precisely focused (diffraction limited) image is achieved in the image plane.

A metalized coating or optical feature to remove transmitted light from the image is lithographically placed about the focusing element. Having the apertures and stops at the principal plane of the focussing element allows for the image size to be precisely controlled by the image distance.

The scattering/reflection reduction is an optical feature that eliminates noise reflecting off the monolithic surface back to the detector plane and into the returning beam path. A monolithic optical element requires each element to be placed close together and a scattering reduction element allows areas that are sensitive to scattering or reflection to be controlled.

The monolithic optical pickup is well suited for use with multiple detector elements. It is necessary to apply apertures to the return path of the monolithic device in order to control cross talk, light designated for one detector that will hit another, and stray light from hitting a detector. The apertures are constructed of a metalization layer or of an optical element to change the direction of the transmitted light. The apertures are placed lithographically and therefore are well controlled in their placement.

Return path optical elements are placed on the monolithic substrate to control the field of view of the detectors or to reimage the image created by the outgoing path onto the detectors. The magnification of the return path is well controlled by an intrinsically controlled image distance, i.e. distance from the return path element to the detector.

Alternate embodiments of the invention, for different applications, may omit some of the optical system elements and/or add others.

An exemplary embodiment of the invention includes the monolithic optical pickup mounted on a carrier together with a laser source and detectors. This embodiment is particularly suitable for use as in an LS-120 disk drive.

Additional objects and advantages of the invention will become apparent to those skilled in the art upon reference to the detailed description taken in conjunction with the provided figures.

DETAILED DESCRIPTION

Figure 1:
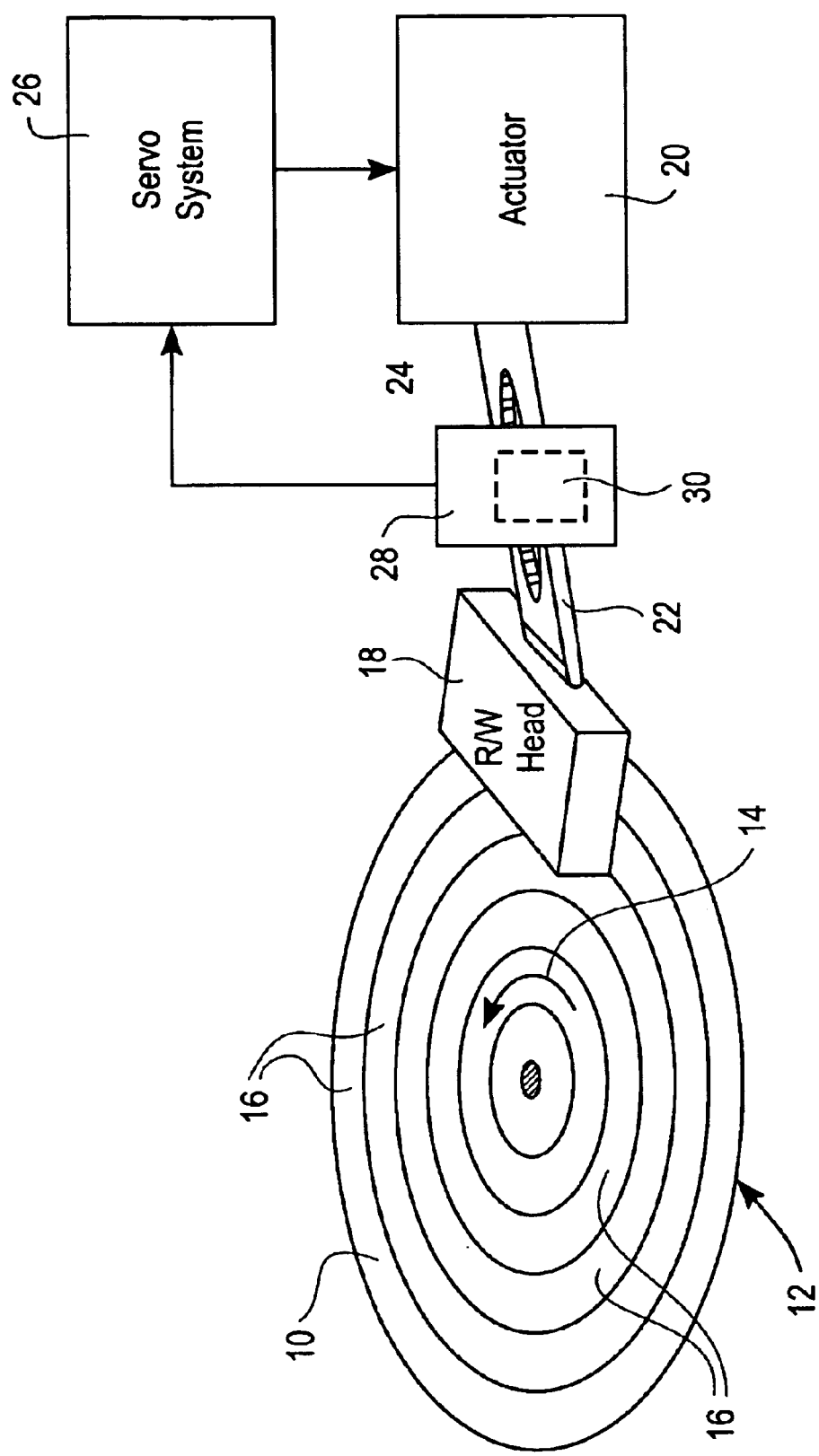
FIG. 1 is a simplified schematic diagram of a prior art LS-120 type disk drive.
Figure 2:
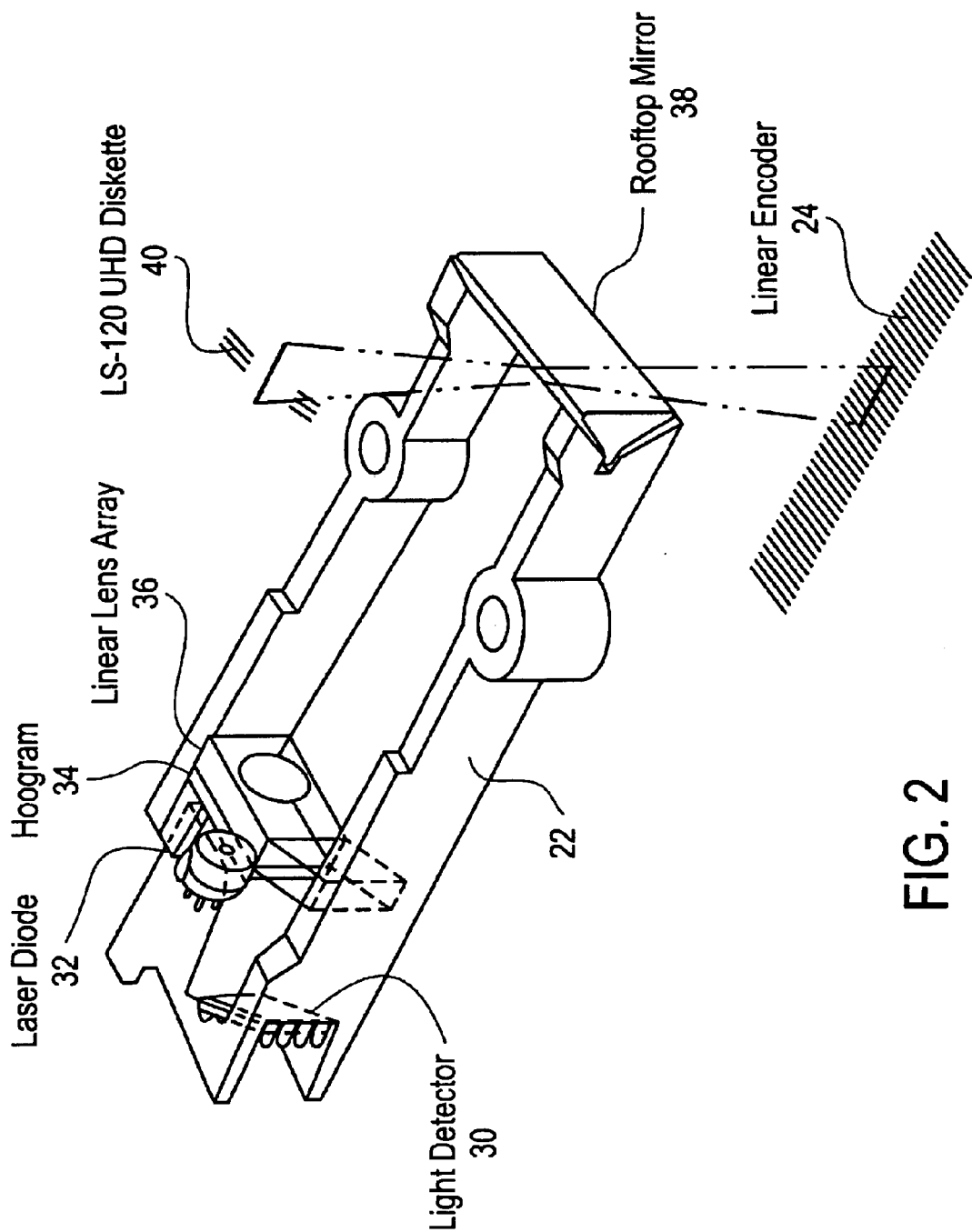
FIG. 2 is a simplified schematic diagram of a prior art optical pickup system for an LS-120 type disk drive.
Figure 5:
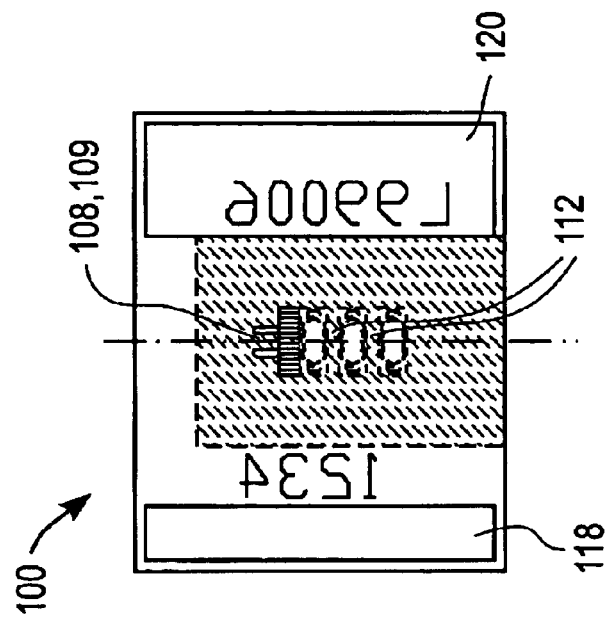
FIG. 5 is a bottom view of the monolithic optical pickup of the invention.
Figure 4:
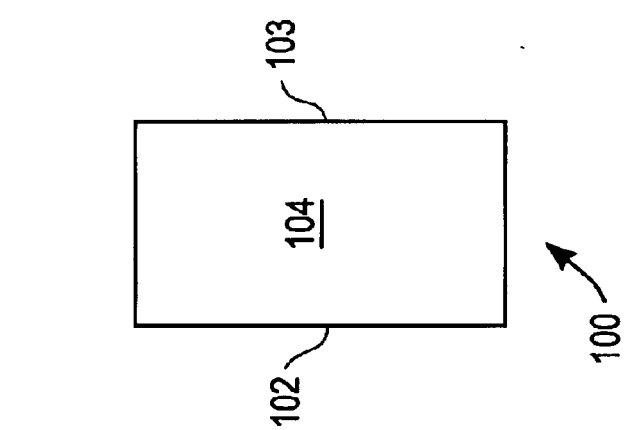
FIG. 4 is a side view of the monolithic optical pickup of the invention.
Figure 3:
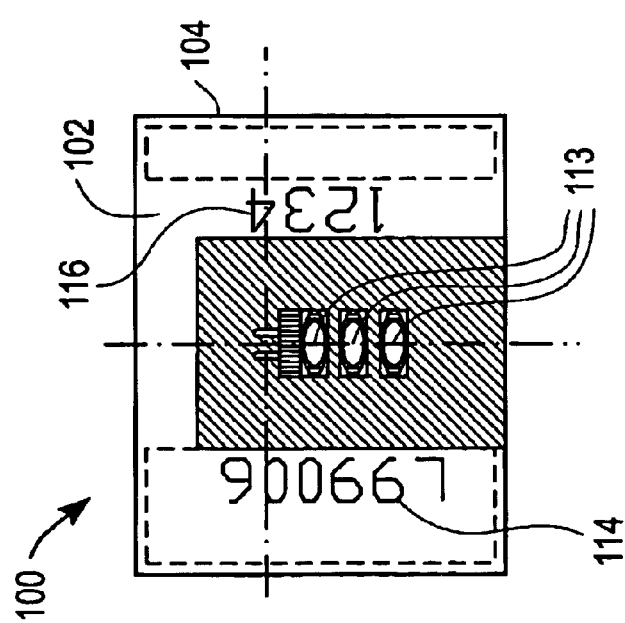
FIG. 3 is a top view of the monolithic optical pickup of the invention.
Figure 6:
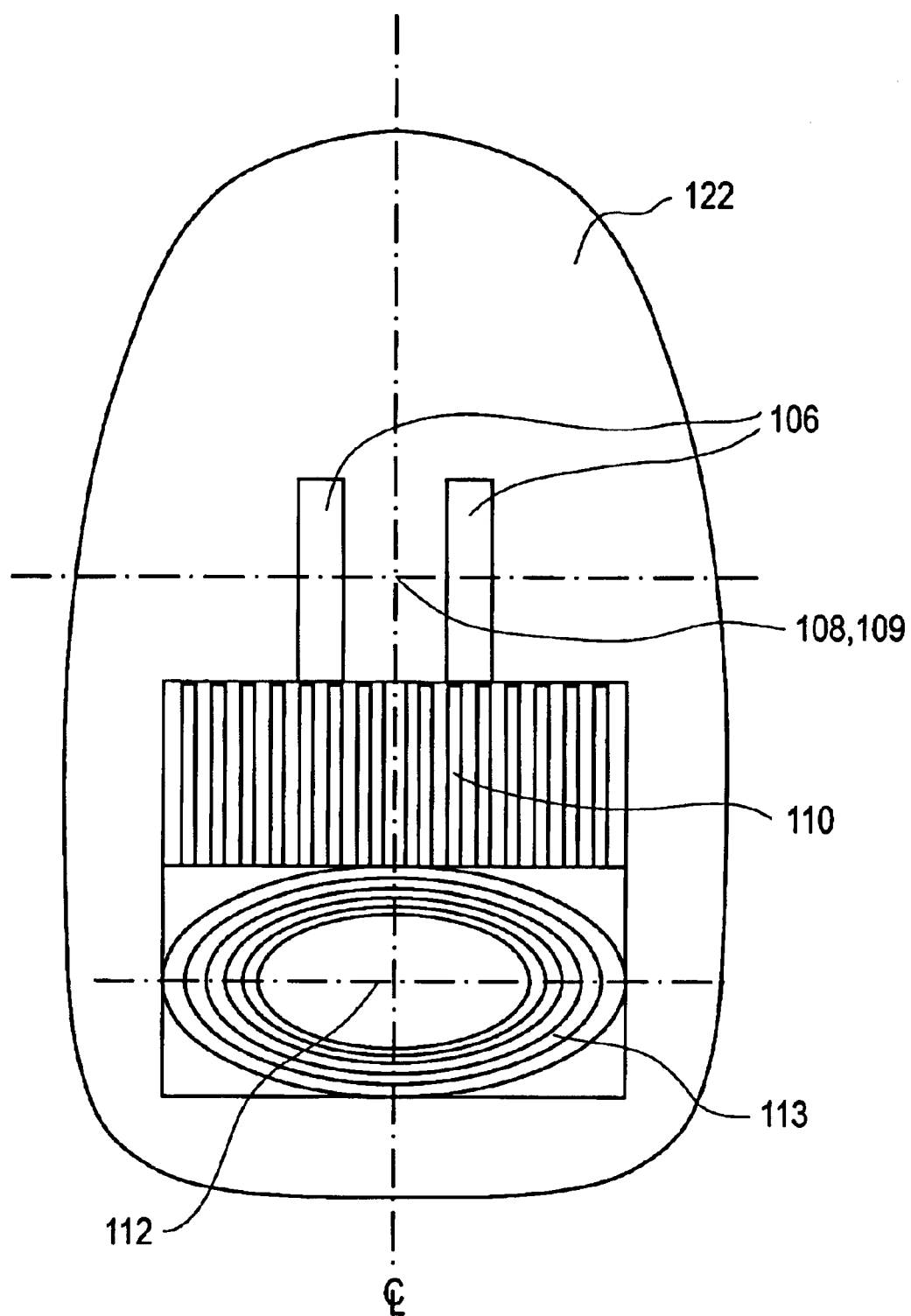
FIG. 6 is an enlarged portion of FIG. 3.

Turning now to FIGS. 3–6, the monolithic optical system 100 according to the invention is formed on one surface 102 of a transparent wafer 104. The system includes a focusing element 106, image creation aperture, 108 and stop 109, a scattering/reflection reduction element 110, and return path apertures 112 and lenses 113. As seen best in FIGS. 3 and 5, the wafer 104 is imprinted with a part number 114 and an optical die number 116. Solder pads 118, 120 are provided on the back side 103 of the wafer for mounting it as described in more detail below with reference to FIG. 7.

The focusing element 106 is placed on the monolithic surface 102 to control the image location relative to the source location (described below with reference to FIG. 7). Those skilled in the art will readily appreciate that assembly techniques are known to tightly control the source location so that a monolithic optical element will repeatedly place the image at a required location. In addition, aberration correction techniques are known for application to the focusing element to ensure a precisely focused (diffraction limited) image is achieved in the image plane.

A metalized coating 122 (chrome mask) or optical feature to remove transmitted light from the image is lithographically placed about the focusing element 106 Placing the apertures and stops at the principal plane 102 of the focussing element 106 allows for the image size to be precisely controlled by the image distance.

Figure 8:
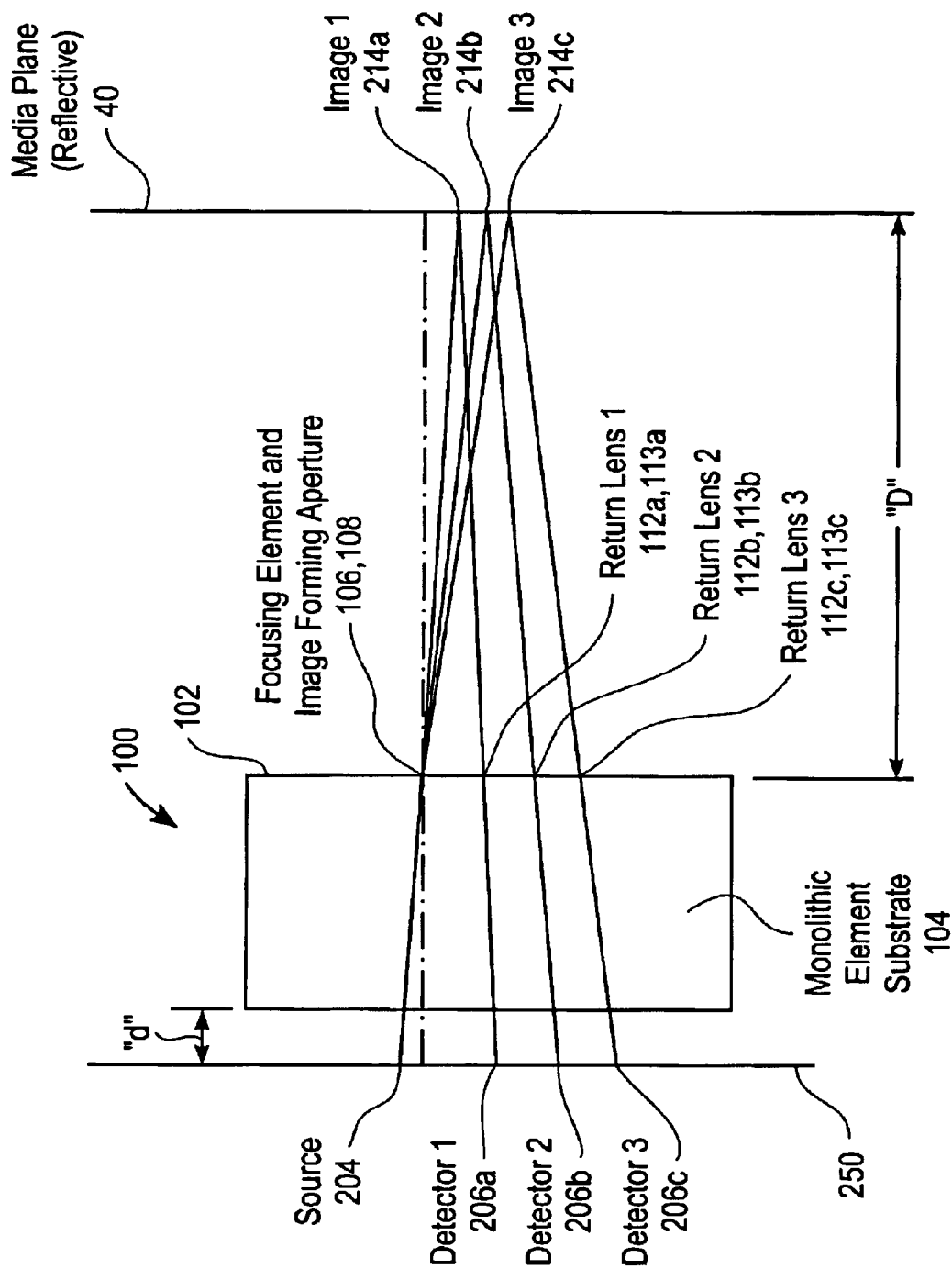
FIG. 8 is a schematic illustration of the device of FIG. 7 in use.

The scattering/reflection reduction element 110 is an optical feature that eliminates noise reflecting off the monolithic surface back to the detector plane 250 (as shown in FIG. 8) and into the returning beam path. The monolithic optical element 100 requires each element to be placed close together and the scattering reduction element 110 allows areas that are sensitive to scattering or reflection to be controlled.

The monolithic optical pickup 100 is well suited for use with multiple detector elements (FIG. 8). It is necessary to apply separate apertures 112 to the return path of the monolithic device 100 in order to control cross talk, i.e. prevent light designated for one detector from hitting another, and prevent stray light from hitting a detector. The apertures are preferably constructed lithographically in the metalization layer.

Return path optical elements 113 are placed on the monolithic substrate 104 to control the field of view of the detectors (FIG. 8) or to reimage the image created by the outgoing path onto the detectors. The magnification of the return path is well controlled by an intrinsically controlled image distance, i.e. distance from the return path element to the detector.

Figure 7:
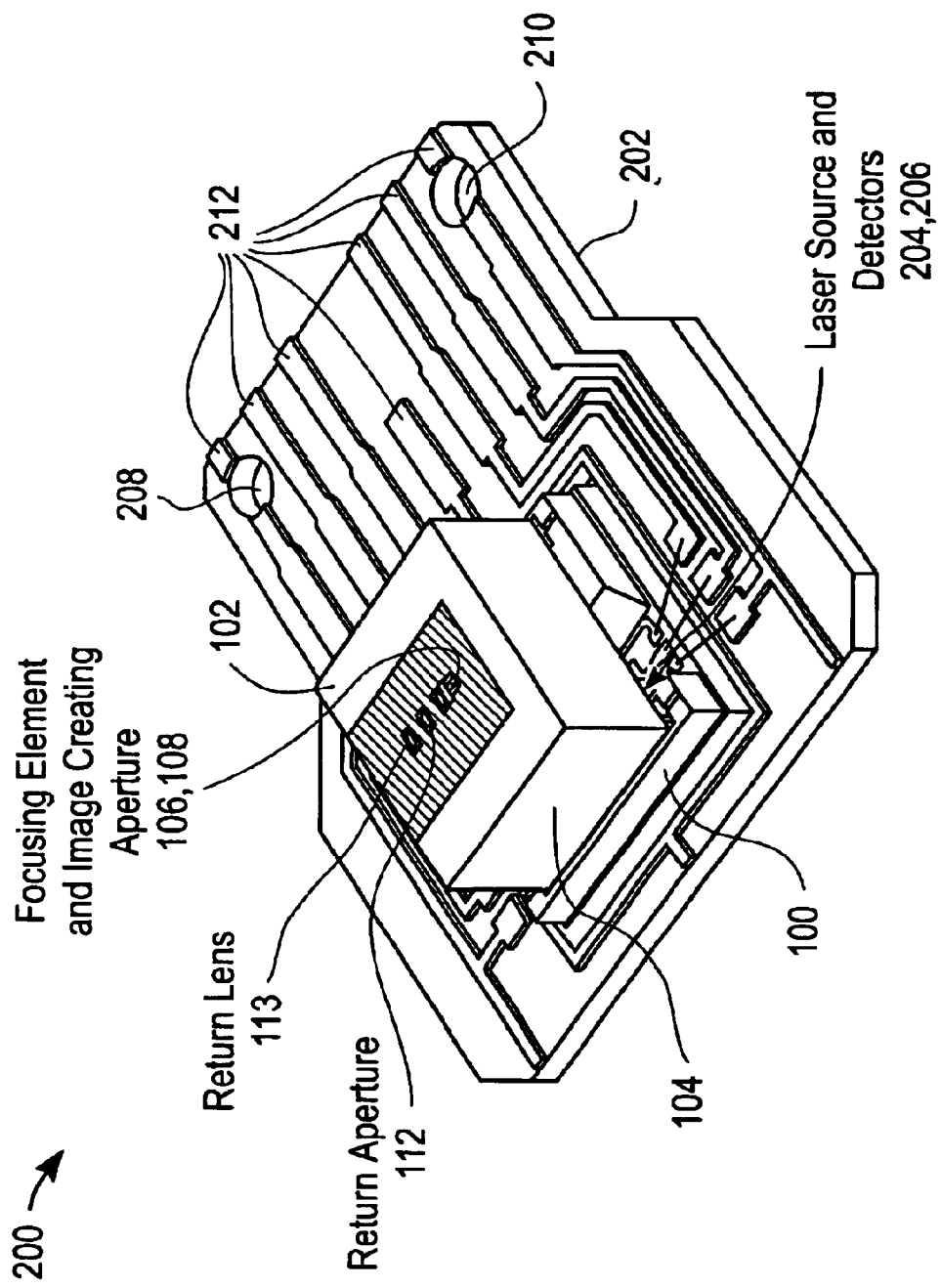
FIG. 7 is an enlarged perspective view of the monolithic optical pickup of the invention mounted on a carrier with a laser source and three optical detectors.

Turning now to FIG. 7, an exemplary embodiment 200 of the invention includes the monolithic optical pickup 100 mounted on a carrier 202 together with a laser source 204 and detectors 206 (FIG. 8). The carrier 202 is provided with mounting holes 208, 210 and electrical contacts 212 and is designed for use in an LS-120 disk drive.

Operation of the apparatus 200 is illustrated in FIG. 8. As shown in FIG. 8, the monolithic optical pickup 100 is mounted a predetermined distance "d" from the laser source 204 and three detectors 206a–206c. The monolithic optical pickup 100 and the laser source 204 are aligned such that light emitted from the source 204 passes through the transparent wafer 104, is refracted by it, and passes through the focusing element 106 and image forming aperture 108, formed on surface 102 of wafer 104. The monolithic optical pickup 100 is located a predetermined distance "D" from the reflective surface of an LS-120 disk 40 such that three images 214a–214c are formed on the surface and reflected back to the monolithic optical pickup 100 at an angle of reflection coinciding with the location of the return apertures 112a–112c and lenses 113a–113c. The three reflected images pass through the apertures 112a–112c and lenses 113a–113c (formed on surface 102 of wafer 104) and are refracted by the wafer 104 such that the strike corresponding detectors 206a–206c.

There have been described and illustrated herein embodiments of a monolithic optical pickup. While particular embodiments of the invention have been described, it is not intended that the invention be limited thereto, as it is intended that the invention be as broad in scope as the art will allow and that the specification be read likewise. Thus, while a particular number of apertures, lenses and lasers have been disclosed, it will be appreciated that other numbers could be utilized. Also, it will be recognized that lithographic process described can be used to form either refractive optical elements or holographic optical elements. It will therefore be appreciated by those skilled in the art that yet other modifications could be made to the provided invention without deviating from its spirit and scope as so claimed.

What is claimed is:

1. A monolithic optical pickup (100), comprising:
   (a) a transparent substrate (104) having a first surface (102) and a second surface (103) which is substantially parallel to said first surface; and
   (b) a metalized layer (122) applied to said first surface, said metalized layer defining one or more image creation apertures and a plurality of return path lenses on the same first surface of the transparent substrate, the image creation apertures being configured in an outgoing light path to form images on a surface of a data storage medium and the return path lenses being configured in a return light path to focus a reflection of the created images onto a plurality of detectors.

2. A monolithic optical pickup (100) according to claim 1 wherein said metalized layer (122) further defines a focusing element (106) on the first surface in the outgoing light path.

3. A monolithic optical pickup (100) according to claim 1 wherein said metalized layer (122) further defines a plurality of return path apertures (112) on the first surface in the return light path.

4. A monolithic optical pickup (100) according to claim 1 wherein said metalized layer (122) further defines an image creation stop (109) and a scattering/reflection reduction element (110) on the first surface in the outgoing light path.

5. A monolithic optical pickup (100) comprising a transparent substrate (104) having a first surface (102) and a second surface (103) which is substantially parallel to said first surface, wherein said first surface (102) includes one or more image creation apertures and a plurality of return path lenses, the image creation apertures being configured in an outgoing light path to form images on a surface of a data storage medium and the return path lenses being configured in a return light path to focus a reflection of the created images onto a plurality of detectors.

6. A monolithic optical pickup (100) according to claim 5 wherein said first surface (102) includes a focusing element (106) in the outgoing light path.

7. A monolithic optical pickup (100) according to claim 5 wherein said first surface (102) includes a plurality of return path apertures (112) in the return light path.

8. A monolithic optical pickup (100) according to claim 5 wherein said first surface (102) includes an image creation stop (109) and a scattering/reflection reduction element (110) in the outgoing light path.

9. An optical pickup system (200), comprising:
   (a) a carrier (202);
   (b) at least one laser source (204) carried on said carrier (202);
   (c) a plurality of detectors (206) carried on said carrier (202);
   (d) a monolithic optical pickup (100) mounted adjacent to said at least one laser source (204) and said plurality of detectors (206), the monolitic optical pickup comprising:
      a transparent substrate (104) having a first surface (102) and a second surface (103) which is substantially parallel to said first surface, and
      a metalized layer (122) applied to said first surface, said metalized layer defining one or more image creation apertures and a plurality of return path lenses on the same first surface of the transparent substrate, the image creation apertures being configured in an outgoing light path from the at least one laser source to form images on a surface of a data storage medium and the return path lenses being configured in a return light path to focus a reflection of the created images onto the plurality of detectors.

10. An optical pickup system (200) according to claim 9 wherein said metalized layer (122) further defines a focusing element (106) on the first surface in the outgoing light path.

11. An optical pickup system (200) according to claim 9 wherein said metalized layer (122) further defines a plurality of return path apertures (112) on the first surface in the return light path.

12. An optical pickup system (200) according to claim 9 wherein said metalized layer (122) further defines an image creation stop (109) a scattering/reflection reduction element (110) on the first surface in the outgoing light path.

13. An optical pickup system (200), comprising:
   (a) a carrier (202);
   (b) at least one laser source (204) carried on said carrier (202);
   (c) a plurality of detectors (206) carried on said carrier (202); and
   (d) a monolithic optical pickup (100) mounted adjacent to said at least one laser source (204) and said plurality of detectors (206), said monolithic optical pickup (100) including a transparent substrate (104) having a first surface (102) and a second surface (103) which is substantially parallel to said first surface, wherein said first surface (102) includes one or more image creation apertures and a plurality of return path lenses, the image creation apertures being configured in an outgoing light path from the at least one laser source to form images on a surface of a data storage medium and the return path lenses being configured in a return light path to focus a reflection of the created images onto the plurality of detectors.

14. An optical pickup system (200) according to claim 13 wherein said first surface (102) includes a focusing element (106) in the outgoing light path.

15. An optical pickup system (200) according to claim 13 wherein said first surface (102) includes a plurality of return path apertures (112) in the outgoing light path.

16. An optical pickup system (200) according to claim 13 wherein said first surface (102) includes an image creation stop (109) and a scattering/reflection reduction element (110) in the outgoing light path.

17. A method of making a monolithic optical pickup (100), comprising the steps of:
   (a) obtaining a transparent substrate (104) having a first surface (102) and a second surface (103) which is substantially parallel to said first surface; and
   (b) defining one or more image creation apetures and a plurality of return path lenses on the same first surface of the transparent substrate, the image creation apertures being defined in an outgoing light path to form images on a surface of a data storage medium and the return path lenses being defined in a return light path to focus a reflection of the created images onto a plurality of detectors.

18. A method according to claim 17 wherein said step of defining further comprises the step of applying a metalized layer (122) to said first surface.

19. A method according to claim 17 further comprising:
defining a focusing element (106) on the first surface in the outgoing light path.

20. A method according to claim 17 further comprising:
defining a plurality of return path apertures (112) on the first surface in the return light path.

21. A method according to claim 17 further comprising:
defining an image creation stop (109) and a scattering/reflection reduction element (110) on the first surface in the outgoing light path.

22. An method of making optical pickup system (200), comprising the steps of:
(a) obtaining a carrier (202);
(b) mounting at least one laser source (204) on the carrier (202);
(c) mounting a plurality of detectors (206) on the carrier (202); and
(d) mounting a monolithic optical pickup (100) adjacent to said at least one laser source (204) and the plurality of detectors (206), the monolithic optical pickup (100) including a metalized layer (122) defining one or more image creation apertures and a plurality of return path lenses on the same first surface of the transparent substrate, the image creation apertures being configured in an outgoing light path from the at least one laser source to form images on a surface of a data storage medium and the return path lenses being configured in a return light path to focus a reflection of the created images onto the plurality of detectors.

23. A method of making an optical pickup system (200), comprising the steps of:
(a) obtaining a carrier (202);
(b) mounting at least one laser source (204) on the carrier (202);
(c) mounting at least one detector (206) on the carrier (202); and
(d) mounting a monolithic optical pickup (100) adjacent to said at least one laser source (204) and the at least one detector (206), the monolithic optical pickup (100) including a transparent substrate (104) having a first surface (102) and a second surface (103) which is substantially parallel to the first surface, wherein the first surface (102) includes one or more image creation apertures and a plurality of return path lenses, the image creation apertures being configured in an outgoing light path from the at least one laser source to form images on a surface of a data storage medium and the return path lenses being configured in a return light path to focus a reflection of the created images onto a plurality of detectors.

24. An optical pickup system (200), comprising:
(a) a carrier (202);
(b) at least one laser source (204) mounted on said carrier (202);
(c) a plurality of detectors (206) mounted on said carrier (202); and
(d) a monolithic optical pickup (100) adjacent to the laser source (204) and the at least one detector (206), said monolithic optical pickup (100) comprising a complete optical system incorporated into a single surface of a transparent wafer, the single surface including one or more image creation apertures and a plurality of return path lenses, the image creation apertures being configured in an outgoing light path from the at least one laser source to form images on a surface of a storage medium and the return path lenses being configured in a return light path to focus a reflection of the created images onto the plurality of detectors.

* * * * *